Figure 1:
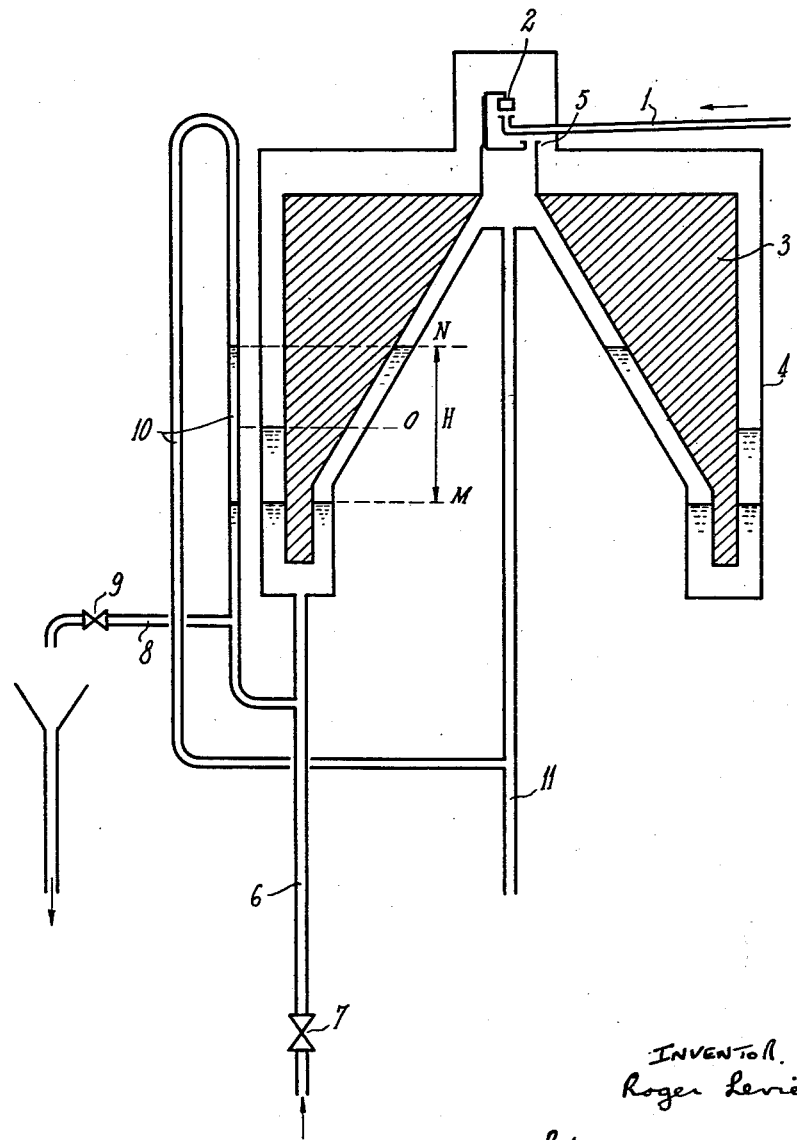

Jan. 22, 1963  R. LEVIEL  3,074,422
AUTOMATIC VALVE CONTROLLED GAS DOSING APPARATUS
Filed March 16, 1959  3 Sheets-Sheet 1

INVENTOR.
Roger Leviel
BY Michael S. Striker
Attorney

United States Patent Office 3,074,422
Patented Jan. 22, 1963

3,074,422
AUTOMATIC VALVE CONTROLLED GAS DOSING APPARATUS
Roger Leviel, Courbevoie, France, assignor to Degremont-Acfi, Rueil-Malmaison, France, a corporation of France
Filed Mar. 16, 1959, Ser. No. 799,526
Claims priority, application France Apr. 8, 1958
10 Claims. (Cl. 137—101.27)

This invention relates to gas dosing apparatus for delivering gas in measured quantities. When the delivery of gas must be regulated to a fixed value, the apparatus usually comprises one or more reducing valves or like devices disposed in such a way as to keep the gas pressure constant, the delivery being then regulated by means of a calibrated orifice or a valve. In order to vary the gas delivery, either the size of the regulating orifice or the adjustment of the reducing valve can be altered so as to vary the pressure on the upstream side of the orifice, the downstream pressure being atmospheric pressure in this case.

Another arrangement for effecting the gas dosing consists in using one or more reducing valves or like devices for keeping constant both the pressure obtaining on the upstream and that on the downstream sides of an orifice or a regulating valve. This provides for constancy of the gas delivery when the gas to be dosed is delivered at a pressure different from atmospheric pressure.

One disadvantage of these known dosing apparatus resides in the lack of precision of the reducing valves or like devices, which are difficult to manufacture in suitable form, especially when it is necessary to utilise corrosion-resistant materials, as is the case when the gas to be dosed is corrosive, for example chlorine.

Very often the gas is intended to be dissolved in a liquid, and the known apparatus to which reference has just been made do not readily permit of proportioning the delivery of gas to that of liquid in a simple manner.

This is particularly the case in the sterilization of water by chlorine. The chlorine is almost always dissolved in a small quantity of water which in turn is mixed with the water to be sterilized.

Recently progress has been made by the introduction of sodium chlorite to chlorinated water, these two reagents together forming chlorine dioxide, a vigorous antiseptic and oxidizing agent, which does not possess the unpleasant smell of chlorine and, in contrast to the latter, never forms with phenols addition compounds having a disagreeable taste.

However, so that this reaction may be produced under the optimum conditions, it is necessary to produce a chlorinated water of constant content, sufficiently rich in chlorine (app. 1 gram per liter), which cannot be obtained directly and in a simple manner with the known gas dosing apparatus.

The invention has for its main object to provide apparatus for obtaining, in a simple manner, a regular delivery and precise dosing of the gas.

This gas dosing apparatus operates in such a way as to keep a constant difference of pressure on the two sides of a calibrated orifice, as already known, but this aim is here achieved without mechanical accessories and without the use of a flexible diaphragm.

The improved apparatus comprises a bell-shaped float, floating inside a vessel into which a liquid is introduced. The float controls the admission of gas into the vessel through a calibrated orifice in the bell, in such a way that the difference of pressure inside the vessel and that under the bell is always equal to the difference between the displacement of the float and the weight of the latter.

The liquid upon which the float rests can be the same liquid in which it is desired to dissolve the gas.

Regulation of the delivery of gas is effected by controlling the delivery or level of the liquid, which results in varying the difference between the pressures on the two sides of the calibrated orifice, in such a way that this pressure difference is always equal to the difference between the displacement of the float and its weight.

The invention is hereinafter described with reference to the accompanying drawings, which illustrate some embodiments of the apparatus, it being understood that these are only examples, and that other shapes, proportions and arrangements of the components can be adopted without departing from the scope of the invention.

FIG. 1 of the drawings represents one embodiment of the apparatus, wherein the gas flows from the exterior towards the interior of the float, but apparatus operating in an identical manner can be arranged with the gas flowing from the inside outwardly.

The gas is supplied through a tube 1, the bent end of which can be closed by a valve 2 fixed to the float 3. The float 3 is housed in a closed vessel or casing 4, which fits its shape with sufficient clearance to permit movement of the float. The general shape of the float 3 is that of a bell, so that when this float rests on a liquid, two separate spaces are thus created: one space situated above and around the outside of the float and the other beneath the float. These two spaces are in communication through a calibrated orifice 5.

A pipe 6 serves for introducing a liquid into the casing 4 through a valve 7.

A pipe 8 controlled by a valve 9 allows of emptying the casing 4 of the contained liquid.

Finally, a transparent level tube 10 in the shape of a siphon permits of checking the level of liquid inside the bell. When the casing 4 is empty, the float 3 hangs upon the valve 2, which blocks the entry of gas.

If liquid is introduced through the valve 7 into the casing 4 up to a certain level (for example O), the float is subject to an upward thrust proportionate to the volume of the float situated below the level O, which thrust balances the inherent weight of the float. The valve 2 then opens, permitting gas to enter the casing 4.

This gas, introduced into the casing 4, can only escape through the orifice 5 and then through a delivery pipe 11. When more gas is delivered through the gas inlet means or conduit 1 than can pass through the restricted orifice 5 into the interior of the bell-shaped float 3, the gas pressure in the gas space at the exterior of the float 3 will rise and force thereby liquid contained in the vessel 4 upwardly into the interior of the float 3. In other words, the liquid level on the outside of the float will drop down to the level M whereas the liquid level in the interior of the float will rise to the level N. Thereby the buoyancy of the float will be reduced, the float 3 will move in downward direction and move the valve 2 connected to the float 3 in a direction to close the opening in the delivery conduit 1. When valve 2 is closed the gas pressure in the gas spaces outside the float and inside the float will equalize again so that the liquid will drop down to the normal liquid level O in which case the buoyancy of the float increases again and will open the valve 2 until a state of equilibrium is obtained in which the amount of gas delivered through the device will depend on the pressure difference in the two gas spaces into which the float divides the gas space above the liquid level.

In order to stop the gas delivery, it is sufficient to empty the casing 4 of the contained liquid, by means of the valve 9.

For a certain level of the liquid contained in the casing 4, the movements of the float are only influenced by the difference between the pressure above and that below the float 3, and not by the absolute value of each of these pressures. The result is that the gas delivery can be adjusted equally well when the delivery pressure of the delivery tube 11 differs from the atmospheric pressure, provided that this latter presssure is relatively constant. The gas can be delivered for dosing under vacuum as well as under pressure.

Another means for causing the apparatus to operate consists in leaving the valve 9 slightly open. In this case, in order to keep the level O constant, it is also necessary to leave the valve 7 open for admission of liquid. By varying the opening of the valve 7, the level O of the water contained in the casing 4 will be modified, as also will the corresponding gas delivery.

Figure 2:
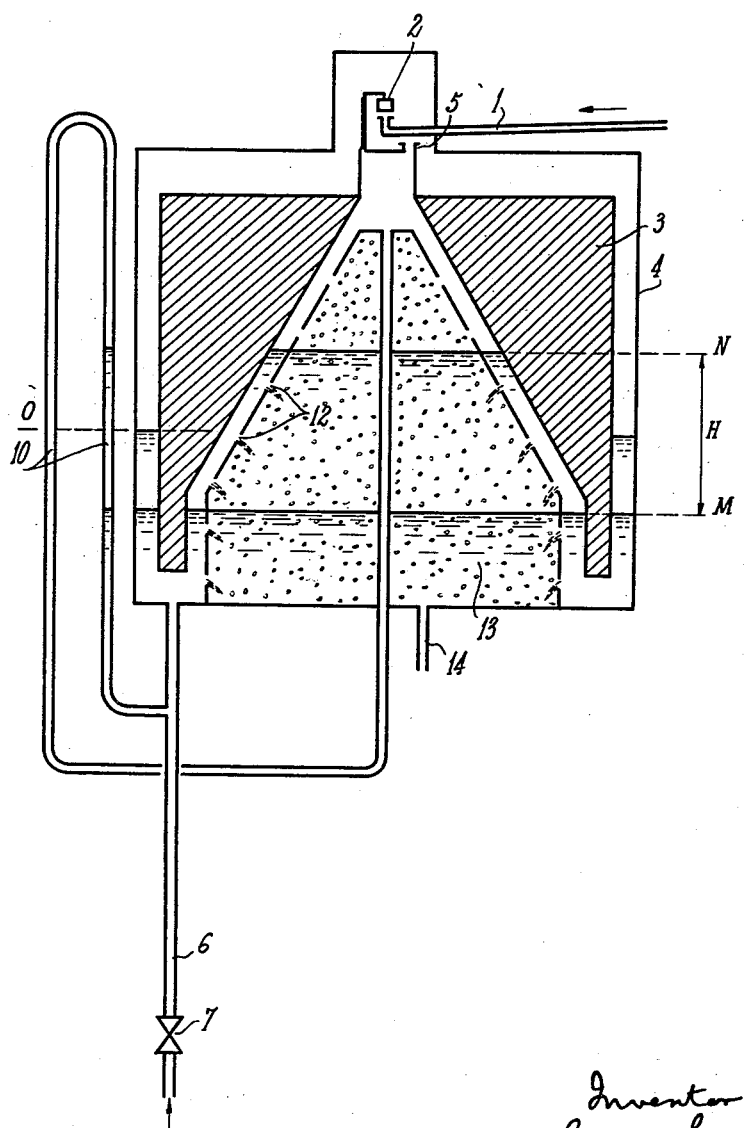

FIG. 2 of the drawings represents, still by way of example, an embodiment of the improved apparatus, intended for use where the gas to be delivered (for example chlorine intended to be used for water sterilization) is to be dissolved in the liquid.

The valve 9 of FIG. 1 is dispensed with and replaced by a series of orifices 12, formed on the lower wall of the casing 4, inside which there is a chamber 13 filled with contact bodies such for example as glass or porcelain rings, the orifices 12 placing this chamber 13 in communication with the casing 4. The water delivered through the pipe 6, as regulated by the valve 7, then flows through the orifices 12 and into the chamber 13, inside which it dissolves the gas, trickling over the contact bodies. The solution formed flows out through a pipe 14.

The location of the orifices 12 and their dimensions must be such that the total delivery flowing through the orifices 12 is always proportional to the square root of the difference H between the level N and level M. In this case, as the delivery of gas passing through the orifice 5 is proportional to the square root of the difference of the pressure on the respective sides of this orifices, and consequently also proportional to the square root of the level difference, it is quite evident that in this way the delivery of gas passing through the orifice 5 is directly proportional to the delivery of water passing through the orifices 12, since these two deliveries are similarly proportional to the immersed volume of the float. Thus the apparatus produces a solution of constant concentration. If it is required to dose water with chlorine, for making a chlorine dioxide antiseptic, it is only necessary to add to this chlorinated water a concentrated solution of sodium chlorite to obtain a chlorine dioxide solution, which can be employed for the sterilization and deodorization of water. Regulation of the delivery of chlorine will be effected by means of the valve 7, and an indication of the delivery is given by the level N shown in the tube 10.

The shapes given to the float 3 in the accompanying drawings are only examples, and the float can be given different shapes. Its external surface is preferably cylindrical or prismatic. Its internal surface can also be cylindrical or prismatic. In any case it is advantageous to give it a shape such that its volume below the level N increases much more than the level N, as the latter rises. This permits of extending the range of possible deliveries for a given apparatus, and of obtaining a gas delivery substantially proportional to the height H. Such proportionality would be strict if the shape of the float were such that for every height H of the level N the volume immersed below the level N, diminished by the weight of the float, were proportional to the square of the height H. In practice, other and simpler shapes may be adopted provided that the apparatus is calibrated to a given standard by measurement of the gas delivery as a function of various levels N.

It will be obvious that many other embodiments are equally possible. More especially, the gas could flow from the interior towards the exterior of the float, instead of flowing inwardly from the exterior, as represented in FIGS. 1 and 2, by a suitable modification of the location and arrangement of the valve 2.

The calibrated orifice 5 could also be disposed on an auxiliary pipe connecting the two spaces defined by the float.

It is possible to render the apparatus automatic in operation, for example in order to cause it to deliver gas in proportion to the delivery of any other fluid; for this purpose it is only necessary to regulate proportionately the delivery of liquid introduced through the conduit 6, as by means of suitable known devices and apparatus.

Figure 3:
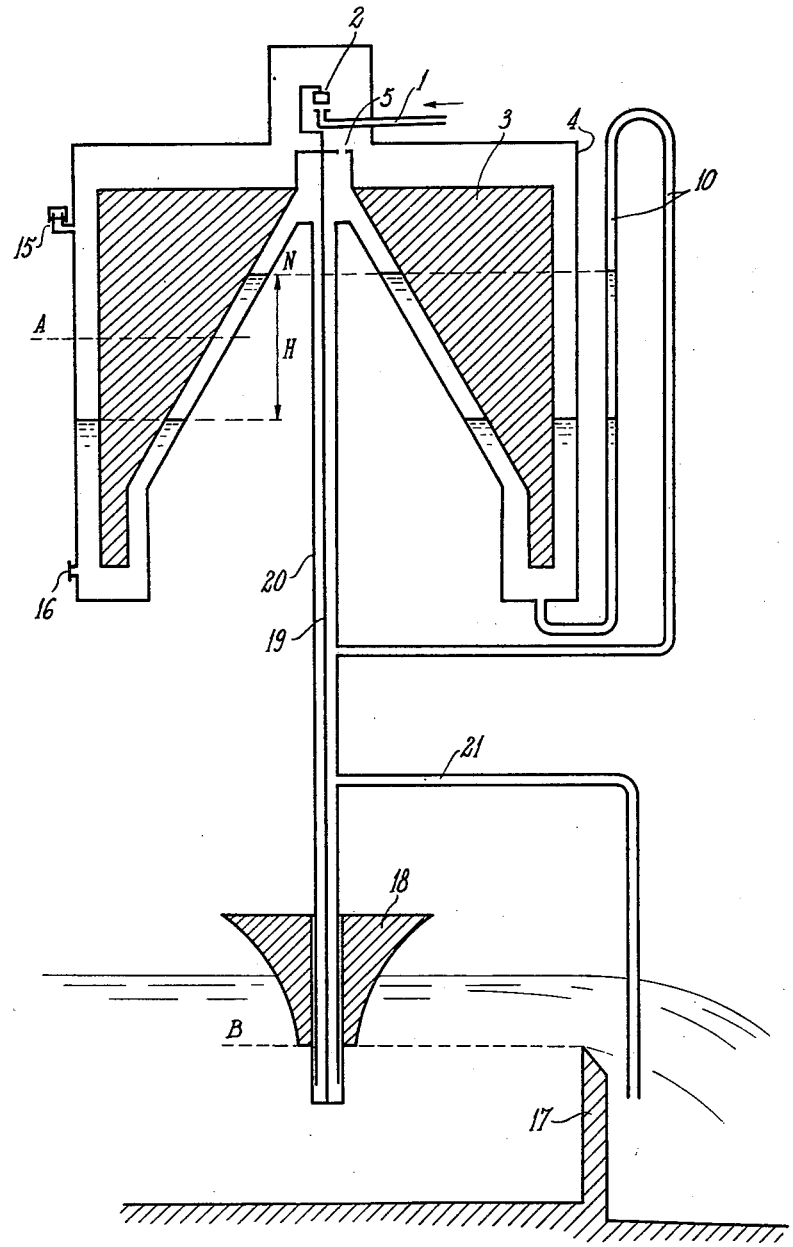

FIG. 3 of the drawings represents another embodiment of the improved dosing apparatus, wherein the delivery of gas is no longer regulated by varying the level of the liquid upon which the float rests, but by varying the weight of the float. This arrangement is especially suitable when it is proposed for example to employ chlorine gas for the sterilization of the water from a culvert, when water under pressure is not available, but it is desired to obtain a chlorine feed proportional to the delivery of the culvert.

The apparatus is filled once and for all, through an inlet provided with a stopper 15, with a liquid of low or nil volatility, up to any level such as A. The apparatus can be emptied, if desired, by way of an outlet fitted with a stopper 16.

Under these conditions, if there is attached to the float 3 a weight of a value P which, added to the weight of the float is equal to the volume of the float immersed below the level N, the float 3 can no longer float, and the valve 2 will therefore close.

On the other hand, if the weight added is less than the value P, the float will tend to rise until the loss of head inside the bell due to the passage of gas through the orifice 5, multiplied by the area of the horizontal section of the float 3, compensates the buoyancy of the assembly comprising the float 3 and the added weight.

For any given value of this added weight there will therefore exist a definite and predetermined delivery of gas.

The weight can consist of any solid body, a container filled more or less with liquid, or by a float, according to the purpose in view.

If the object is to sterilize the water from a culvert with chlorine gas, it is possible to adopt the arrangement represented by way of example in FIG. 3. An overflow weir 17 is disposed in the line of the culvert, and to the float 3 there is attached a weight 18, as by a rod 19 housed in a sheath 20, in such a way that the lower end of the weight 18 is in line with the level B of the overflow weir 17.

When no water flows over the weir 17, the weight 18 hangs entirely on the float 3. The weight is so selected that it is equal to the volume of the float immersed below the level N, diminished by the weight of the float. Under these conditions, the valve 2 is closed.

When water flows over the weir 17, the water level rises and the water bathes the weight 18 with a volume increasing as the flow increases. The weight 18 is thus buoyed up by its immersed volume, and the float 3 is then subject to a vertical thrust equal to the immersed volume of the weight 18; consequently the valve 2 will lift until the loss of head in the float due to the passage of the gas through the orifice 5 multiplied by the area of the horizontal section of the float, is again equal to the immersed volumes of the float 3 and of the weight 18, less their respective weights.

The loss of head due to passage of the gas through the orifice 5 creates a difference between the liquid levels outside and inside the float 3, which has the consequence of increasing further the thrust exerted upon the float 3 by the liquid contained in the casing 4; in other words, the buoyancy of the float 3 is not constant.

This buoyancy force can be made practically constant by greatly increasing the volume available for the liquid below the float 3, in relation to the volume available outside, in such a way that a variation of level outside the bell causes only a negligible change in the level inside.

However, it is possible to retain the shapes of the float 3 and of the casing 4 represented in FIGS. 1 and 2, provided they are considered in determining the shape of the weight 18, for example a paraboloid shape as shown.

The water flowing over the weir 17 is proportional to the height of water above the sill of the weir multiplied by an exponent or factor "a" depending on the shape given to the overflow 17.

Furthermore, the delivery of gas through the orifice 5 is proportional to the square root of the difference between the sum of the immersed volumes of the float 3 and weight 18 and the sum of their respective weights. It follows that proportionality between the delivery of gas and the delivery of water will be ensured if the weight 18 is given such a shape such that the square root of the difference between the sum of the immersed volumes of the float 3 and weight 18 and the sum of their respective weights is always proportional to the exponent "a" corresponding to the depth of water above the weir 17.

The suspension rod 19 of the float 18 is housed in a sheath 20, as mentioned above, in order to avoid escape of gas into the atmosphere, the lower end of this sheath being immersed in water below the level of the weir 17, so as to constitute a hydraulic seal. The gas can be led into the water to be sterilized through a perforated pipe immersed in the water, or more simply by a pipe 21 opening below the water surface, downstream of the weir 17, as shown in FIG. 3.

What I claim is:

1. A gas flow regulating device comprising, in combination, a closed vessel; a liquid filling said vessel up to a predetermined level and defining a gas space above said level; float means located in said vessel floating in said liquid and extending partly above said liquid and dividing said gas space into two separate space portions being normally at the same gas pressure; gas inlet means for feeding gas under pressure into one of said space portions; restricted gas outlet means communicating with said one space portion so that gas pressure in said one space portion will increase over the gas pressure in the other space portion when more gas is delivered through said inlet means than can pass through said restricted outlet means, resulting in lowering of the liquid level in said one space portion so as to reduce thereby the buoyance of said float and corresponding downward movement of the same; valve means operatively connected to said float means for closing said gas inlet means when said float means is moving in downward direction and for opening said gas inlet means when said float means is moving in upward direction; and means acting on said float means for changing the position thereof independent of variations of pressure in said space portions without preventing the free floating of the float means in said liquid.

2. A gas flow regulating device comprising, in combination, a closed vessel; liquid filling said vessel up to a predetermined level and defining a gas space above said level; float means located in said vessel floating in said liquid and extending partly above said liquid and dividing said gas space into two separate space portions; gas inlet means for feeding gas under pressure into one of said separate space portions; gas outlet means for delivering gas from the other of said separate space portions; restricted passage means providing communication between said one and said other space portion so that when more gas is delivered through said inlet means than can pass through said restricted passage means gas pressure in said one space portion will increase causing rise of the liquid in said other space portion, changing thereby the buoyancy of said float means and causing corresponding movement of the same; valve means operatively connected to said float means for closing said gas inlet means when the liquid in said other space portion rises above and for opening said gas inlet means when the liquid in said other space portion falls below said predetermined level; and means acting on said float means for changing the position thereof independent of variations of pressure in said space portions without preventing the free floating of said float means in said liquid to obtain thereby a selected delivery of gas from said other space portion.

3. A gas flow regulating device comprising, in combination, a closed vessel; liquid filling said vessel up to a predetermined level and defining a gas space above said level; bell-shaped float means located in said vessel floating in said liquid and extending partly above said liquid and dividing said gas space into two separate space portions, one at the exterior of said bell-shaped float means and another in the interior of said bell-shaped float means; gas inlet means for feeding gas under pressure into one of said separate space portions; gas outlet means for delivering gas from the other of said separate space portions; restricted passage means providing communication between said one and said other space portion so that when more gas is delivered through said inlet means than can pass through said restricted passage means gas pressure in said one space portion will increase causing rise of the liquid in said other space portion, changing thereby the buoyancy of said float means and causing corresponding movement of the same; valve means operatively connected to said float means for closing said gas inlet means when the liquid in said other space portion rises above and for opening said gas inlet means when the liquid in said other space portion falls below said predetermined level; and means acting on said float means for changing the position thereof independent of variations of pressure in said space portions without preventing the free floating of said float means in said liquid to obtain thereby a selected delivery of gas from said other space portion.

4. A device as defined in claim 3 in which said float means has a side wall portion adapted to be at least partly immersed in said liquid and said side wall portion increasing in dimension toward the upper end of said float means.

5. A gas flow regulating device comprising, in combination, a closed vessel; liquid filling said vessel up to a predetermined level and defining a gas space above said level; float means located in said vessel floating in said liquid and extending partly above said liquid and dividing said gas space into two separate space portions; gas inlet means for feeding gas under pressure into said one separate space portion at the exterior of said bell-shaped float means; gas outlet means for delivering gas from said other separate portion in the interior of said bell-shaped float means; restricted passage means providing communication between said one and said other space portion so that when more gas is delivered through said inlet means than can pass through said restricted passage means gas pressure in said one space portion will increase causing rise of the liquid in said other space portion, reducing thereby the buoyancy of said float means and causing corresponding downward movement of the same; valve means operatively connected to said float means for closing said gas inlet means when the liquid in said other space portion rises above said predetermined level and said float means moves in downward direction and for opening said gas inlet means when the liquid in said other space portion falls below said predetermined level and said float means moves in upward direction; and means acting on said float means for changing the position thereof independent of variations of pressure in said space portions without preventing the free floating of said float means in said liquid to obtain thereby a selected delivery of gas from said other space portion.

6. A gas flow regulating device comprising, in combination, a closed vessel; means for feeding liquid into said vessel up to a predetermined level so as to leave a gas space above said level; float means located in said vessel floating in said liquid and extending partly above said liquid and dividing said gas space into two separate space portions; gas inlet means for feeding gas under pressure into one of said separate space portions; fluid outlet means for delivering fluid from the interior of said vessel; restricted passage means providing communication between said one and said other space portion so that when more gas is delivered through said inlet means than can pass through said restricted passage means gas pressure in said one space portion will increase causing rise of the liquid in said other space portion, changing thereby the buoyancy of said float means and causing corresponding movement of the same; valve means operatively connected to said float means for closing said gas inlet means when the liquid in said other space portion rises above and for opening said gas inlet means when the liquid in said other space portion falls below said predetermined level; and means acting on said float means for changing the position thereof independent of variations of pressure in said space portions without preventing the free floating of said float means in said liquid to obtain thereby a selected delivery of gas from said other space portion.

7. A gas flow regulating device comprising, in combination, a closed vessel; liquid filling said vessel up to a predetermined level and defining a gas space above said level; float means located in said vessel floating in said liquid and extending partly above said liquid and dividing said gas space into two separate space portions; gas inlet means for feeding gas under pressure into one of said separate space portions; gas outlet means for delivering gas from the other of said separate space portions; restricted passage means providing communication between said one and said other space portion so that when more gas is delivered through said inlet means than can pass through said restricted passage means gas pressure in said one space portion will increase causing rise of the liquid in said other space portion, changing thereby the buoyancy of said float means and causing corresponding movement of the same; valve means operatively connected to said float means for closing said gas inlet means when the liquid in said other space portion rises above and for opening said gas inlet means when the liquid in said other space portion falls below said predetermined level; and means communicating with said vessel for changing the predetermined level of said liquid therein to change thereby the position of said float means in said vessel.

8. A gas flow regulating device comprising, in combination, a closed vessel; liquid filling said vessel up to a predetermined level and defining a gas space above said level; float means located in said vessel floating in said liquid and extending partly above said liquid and dividing said gas space into two separate space portions; gas inlet means for feeding gas under pressure into one of said separate space portions; gas outlet means for delivering gas from the other of said separate space portions into a stream of liquid which includes means for changing its level according to the rate of flow thereof; restricted passage means providing communication between said one and said other space portion so that when more gas is delivered through said inlet means than can pass through said restricted passage means gas pressure in said one space portion will increase causing rise of the liquid in said other space portion, changing thereby the buoyancy of said float means and causing corresponding movement of the same; valve means operatively connected to said float means for closing said gas inlet means when the liquid in said other space portion rises above and for opening said gas inlet means when the liquid in said other space portion falls below said predetermined level; and weight means partly immersed in said stream of liquid and operatively connected to said float means for changing the effective weight thereof for adjusting the delivery of gas into said stream of liquid depending on the rate of flow of the latter.

9. A gas flow regulating device comprising, in combination, a closed vessel; adjustable means for feeding liquid into said vessel up to a predetermined level so as to leave a gas space above said level; bell-shaped float means located in said vessel floating in said liquid and extending partly above said liquid for dividing said gas space into two separate space portions, one at the exterior and the other in the interior of said bell-shaped float means; gas inlet means for feeding gas under pressure adapted to be dissolvable in said liquid into said one exterior space portion; restricted passage means providing communication between said two separate space portions so that when more gas is delivered through said inlet means than can pass through said restricted passage means gas pressure in said one space portion will increase causing rise of the liquid in said other space portion, reducing thereby buoyancy of said float means and causing downward movement thereof; chamber means extending from said vessel upwardly into the interior of said float means and being formed with a plurality of restricted openings providing communication between the interior of said float means and the interior of said chamber means; valve means operatively connected to said float means for closing said gas inlet means when the liquid in said other space portion rises above said predetermined level and said float means moves in downward direction and for opening said gas inlet means when the liquid in said other space portion falls below said predetermined level and said float means moves in upward direction; and outlet means communicating with said chamber means for delivering liquid and gas dissolved therein from said chamber means.

10. Apparatus for producing a solution of gas in a liquid of selected constant concentration independent of the pressure of the gas fed into the apparatus comprising, in combination, a closed vessel; liquid filling said vessel up to a predetermined level and defining a gas space above said level; bell-shaped float means located in said vessel floating in said liquid and extending partly above said liquid for dividing said gas space into two separate space portions, one at the exterior and the other in the interior of said bell-shaped float means; gas inlet means for feeding gas under pressure adapted to be dissolvable in a liquid into said one exterior space portion; restricted passage means providing communication between said two separate space portions so that when more gas is delivered through said inlet means than can pass through said restricted passage means, gas pressure in said one space portion will increase, causing rise of the liquid in the vessel in said other space portion, reducing thereby buoyancy of said float means and causing downward movement thereof; valve means operatively connected to said float means for closing said gas inlet means when the liquid in said other space portion rises above said predetermined level and said float means moves in downward direction and for opening said gas inlet means when the liquid in said other space portion falls below said predetermined level and said float means moves in upward direction; gas outlet means for delivering gas from said interior space portion into a stream of liquid in which said gas is dissolvable to obtain thereby a solution of selected constant concentration of gas in said stream of liquid independent of the pressure of gas fed into the apparatus; and means cooperating with said float means for changing the position thereof independent of the gas pressure in said space portions without preventing the free floating of said float means in the liquid in the vessel and automatic change of the positions of said float means due to variations in said gas pressure.

References Cited in the file of this patent

UNITED STATES PATENTS

| | | |
|---|---|---|
| Re. 15,580 | Trumble | Apr. 17, 1923 |
| 157,280 | Giroud | Dec. 1, 1874 |
| 578,212 | Cline | Mar. 2, 1897 |
| 885,681 | Weeks | Apr. 21, 1908 |
| 1,120,070 | Lytton | Dec. 8, 1914 |
| 1,161,958 | Olson | Nov. 30, 1915 |
| 1,177,314 | Gattermeir | Mar. 28, 1916 |
| 1,649,602 | Ledoux | Nov. 15, 1927 |
| 2,394,437 | Freeman | Feb. 5, 1946 |
| 2,396,962 | Moore | Mar. 19, 1946 |
| 2,950,733 | Perkins | Aug. 30, 1960 |

FOREIGN PATENTS

| | | |
|---|---|---|
| 345,870 | Great Britain | Apr. 2, 1931 |